(12) United States Patent
Muench et al.

(10) Patent No.: US 8,897,904 B2
(45) Date of Patent: Nov. 25, 2014

(54) MEDIA CONTENT PLAYBACK

(75) Inventors: Tobias Muench, Straubenhardt (DE);
Christoph Benz, Ohlsbach (DE);
Andreas Koerner, Waldbronn (DE);
Philipp Schmauderer, Hoefen (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 588 days.

(21) Appl. No.: 13/173,938

(22) Filed: Jun. 30, 2011

(65) Prior Publication Data

US 2012/0002515 A1    Jan. 5, 2012

(30) Foreign Application Priority Data

Dec. 23, 2010   (EP) .................................... 10196841

(51) Int. Cl.
*G06F 17/00* (2006.01)
*H04N 21/414* (2011.01)
*H04N 21/422* (2011.01)
*H04N 21/442* (2011.01)
*H04N 21/466* (2011.01)
*H04N 21/81* (2011.01)
*H04N 21/45* (2011.01)

(52) U.S. Cl.
CPC ... *H04N 21/42202* (2013.01); *H04N 21/41422* (2013.01); *H04N 21/44204* (2013.01); *H04N 21/4668* (2013.01); *H04N 21/8113* (2013.01); *H04N 21/4524* (2013.01); *H04N 21/4532* (2013.01)
USPC .......................................................... 700/94

(58) Field of Classification Search
CPC .................... G06F 17/30749; G06F 17/30766; G06F 17/30772; G06F 17/30867; G10H 2240/061; G10H 2240/131; H04N 21/4826; H04N 21/442222; H04N 21/4825; H04N 21/84; H04H 60/45; H04H 60/74
See application file for complete search history.

(56) References Cited

U.S. PATENT DOCUMENTS

| | | | |
|---|---|---|---|
| 6,526,411 B1 * | 2/2003 | Ward ..................................... | 1/1 |
| 6,657,116 B1 * | 12/2003 | Gunnerson ..................... | 84/615 |
| 6,748,395 B1 * | 6/2004 | Picker et al. .......................... | 1/1 |
| 7,313,571 B1 * | 12/2007 | Platt et al. ............................. | 1/1 |
| 2002/0041692 A1 * | 4/2002 | Seto et al. ........................ | 381/86 |

(Continued)

OTHER PUBLICATIONS

Loeb, "Architecting personalized delivery of multimedia information", Communications of the ACM, Association for Computing Machinery, Inc., vol. 35, No. 12, Dec. 1992, pp. 39-48.

(Continued)

*Primary Examiner* — Andrew C Flanders
(74) *Attorney, Agent, or Firm* — O'Shea Getz P.C.

(57) ABSTRACT

Media content playback includes providing a plurality of media contents; providing for each of the media contents information identifying the respective media content; receiving from a user selection instructions that effect selecting or deselecting of a specific media content; providing context data based on measurements of at least one of absolute time, absolute position and of at least one physical quantity at or in the vicinity of the location where the selected media content is to be reproduced; providing or adapting a user profile that assigns for each specific media content user instructions to the context data provided at the time of receipt of the respective instruction; selecting according to the user profile one of the media contents dependent on the context data at the time of selection; and reproducing the selected media content.

11 Claims, 6 Drawing Sheets

(56) References Cited

U.S. PATENT DOCUMENTS

| | | |
|---|---|---|
| 2002/0104087 A1* | 8/2002 | Schaffer et al. ................ 725/46 |
| 2002/0142722 A1 | 10/2002 | Gutta |
| 2003/0089218 A1* | 5/2003 | Gang et al. .................... 84/615 |
| 2003/0126606 A1 | 7/2003 | Buczak |
| 2005/0021470 A1* | 1/2005 | Martin et al. .................. 705/51 |
| 2008/0104624 A1 | 5/2008 | Narasimhan |

OTHER PUBLICATIONS

Pazzani et al., "Content-Based Recommendation Systems", The adaptive web, Lecture Notes in Computer Science, Springer Berlin Heidelberg, Berlin, Heidelberg, pp. 325-341, Apr. 2007.

* cited by examiner

MEDIA CONTENT PLAYBACK

CLAIM OF PRIORITY

This patent application claims priority from DE Application No. 10 2010 030 912.5 filed Jul. 2, 2010 and EP Application No. 10 196 841.0 filed Dec. 23, 2010, which are hereby incorporated by reference.

FIELD OF TECHNOLOGY

This invention relates to a media content playback method and system.

RELATED ART

Technological advances have created the availability of a vast amount of media content such as text, audio, video, pictures and other information in many different formats and provided by many different sources such as computer networks, radio networks, television networks and all types of local memories, including Compact Disc (CD), Digital Versatile Disc (DVD), volatile and non-volatile semiconductor memories, hard discs and other memories. The various networks allow easy access to information throughout the world and facilitate information delivery world-wide in the form of text files, data, motion pictures, video clips, picture files, music files, web pages, flash presentations, shareware, computer programs, command files, radio and television programs. Local (e.g., memory oriented) media sources are able to provide the user with his favorite contents anywhere and at any time. One obstacle to access and delivery of media contents is a lack of interoperability and resource management among devices and content formats. Another problem is the inability to navigate the many combinations of sources, media contents, and formats that are constantly changing and updating.

SUMMARY OF THE INVENTION

According to a first aspect of the invention, a method of media content playback includes providing a plurality of media contents; providing for each of the media contents content information identifying the respective media content; receiving selection instructions that effect selecting or deselecting of a specific media content; providing context data based on measurements of one or more of absolute time, absolute position, and at least one physical quantity at or in the vicinity of the location where the selected media content is to be reproduced; providing or adapting a user profile that assigns for each specific media content user instructions to the context data provided at the time of receipt of the respective instruction; selecting according to the user profile one of the media contents dependent on the context data at the time of selection; and reproducing the selected media content.

According to another aspect of the invention, a media content playback system comprises a media source that provides multiple media contents or multiple media sources that each provide at least one media content and that provide for each of the media contents information identifying the respective media content; a playback unit that is linked to the media source(s) and that is adapted to reproduce the media contents provided by the one or more media sources; a control unit that is linked to and controls the playback unit and that selects one of the media contents to be reproduced by the playback unit; a user interface that is linked to the control unit and that is adapted to receive user instructions and to provide representations thereof to the control unit; and a time base unit and/or at least one sensor that is/are linked to the control unit and that provide(s) representations of the absolute time and/or of at least one physical quantity at or in the vicinity of the location where the selected media content is reproduced; in which the control unit is further configured to provide or adapt a user profile that assigns for each specific media content user instructions to the context data provided at the time of receipt of the respective instruction and to select according to the user profile one of the media contents dependent on the context data at the time of selection of the media content.

These and other objects, features and advantages of the present invention will become apparent in light of the detailed description of the best mode embodiment thereof, as illustrated in the accompanying drawings. In the figures, like reference numerals designate corresponding parts.

DETAILED DESCRIPTION OF THE INVENTION

An ever wider selection of online music titles, for example in MP3 format, is being offered to consumers for their convenient purchase. The consumer is able to selectively choose single titles that correspond to his/her own taste and is not forced to acquire unwanted titles together with the chosen ones by purchasing an entire data medium. Easy access to individual music titles, in particular in MP3 format, has made it possible to create expansive private music collections. These music collections can be downloaded onto suitable media or music players, e.g., installed in motor vehicles. In addition, modern motor vehicle media players offer the possibility of choosing music titles from among various other sources, for example analog and digital radio (AM/FM, DAB), internet radio or CD/DVD.

As the number of recorded music titles increases, the frequency with which a particular title is reproduced, i.e., played, decreases, especially when a so-called random shuffle playback is employed. The random shuffle playback mode is not capable of choosing specific titles, for example titles of a certain music style. The random shuffle playback mode is likewise incapable of taking into consideration a listening situation, for instance, a particular driving situation. Specifically, the personal preferences of passengers or the current driving speed cannot be taken into consideration when choosing the music title. To do so, the driver must resort to the manual selection of a music title, which distracts his attention from the traffic situation.

A characteristic of media or music player configurations, also known as infotainment systems, is the possibility they offer the user of choosing his/her preferred source of music. In order to select the music source, however, the driver must become actively engaged, in particular, when the user has constant access to a data bank containing a program that corresponds to his/her individual taste or immediate preference and in situations in which none of the designated sources offer a desirable program.

In order to ensure that the played program is individually adapted to the user's tastes and preferences, the present method and system make use of additional information, e.g., transmitted by radio stations, contained in music files or provided to identify the genre and the characterizing information of the media content to be played. A learning algorithm is implemented which analyses the user's personal preferences and evaluates them in reference to the listening situation, e.g., the driving context. Initially, this may be carried out in a random shuffle play mode, during which the skip-behaviour of the user, that is, which titles he jumps over, is analysed. Alternatively or additionally, the repeat-behaviour or any other suitable action of the user may be analyzed. Every such action of the user, e.g., in the form of respective instructions to the system, is recorded by the learning algorithm as an observation and is, in particular, related to the driving context.

Sensors (already) located throughout the motor vehicle may be used to measure values such as absolute time, interior and/or exterior temperature, atmospheric humidity (e.g., using a rain sensor), light intensity, driving speed, engine speed, number of passengers, (global) position and other related values, all of which may be taken into consideration by the learning algorithm. In addition, the user, e.g., the driver, may be provided with the possibility of entering the number of passengers present in the vehicle into an appropriate interface, in case the vehicle in not equipped with corresponding sensors. A further conceivable feature would be the possibility of taking into consideration values such as work days vs. weekends and/or the respective season, as well as Global Positioning System (GPS) data, calendar date, month and/or time of day.

The underlying algorithm, when operating in the basic function of "learning", is capable of, for example, assessing the skip-behaviour of the user throughout the driving context. The algorithm records the simple skipping of titles, induced by the driver's lack of interest in the currently played title. A lack of reaction on the part of the user, "skip but like it in general" instructions, or "repeat song" instructions, in contrast, indicate a certain preference of the user. Optionally, the manner in which the driver's reaction to the music title depends on the driving context may also be evaluated.

While operating in its other basic function of "playback", after having gathered sufficient learning experience, the algorithm is subsequently capable of selectively choosing music titles appropriately adapted to the driving context. The media contents may be identified by for example so-called meta data that contain certain information such as genre, beats-per-minute (BPM), title, artist, year of publication, etc. If the current algorithm is lacking tags, a so-called auto-tag algorithm may, for example, selectively analyze beats-per-minute (BPM), tonality, instrumental texture, etc. and/or send the titles to an internet categorization service, in order to automatically obtain the required tags.

In addition, the system and method described herein are capable of producing an element of surprise. When doing so, the algorithm randomly suggests music titles that do not correspond to the conditions recorded in the various driving contexts. By doing so, a random quality is added that maintains the adaptivity of the system and method such that they do not end up in a fixed assumed pattern. Conceivable, but not necessarily required, would also be the possibility of adjusting the probability with which the element of surprise should occur.

The content may be acquired from one or more sources, including sources capable of network connection and/or sources capable of local storage. The content and sources are capable of dynamic change. The method described herein also includes dynamically configuring a user interface that enables automatic selection and access of the content, the dynamic configuring may be user-transparent.

Figure 1:
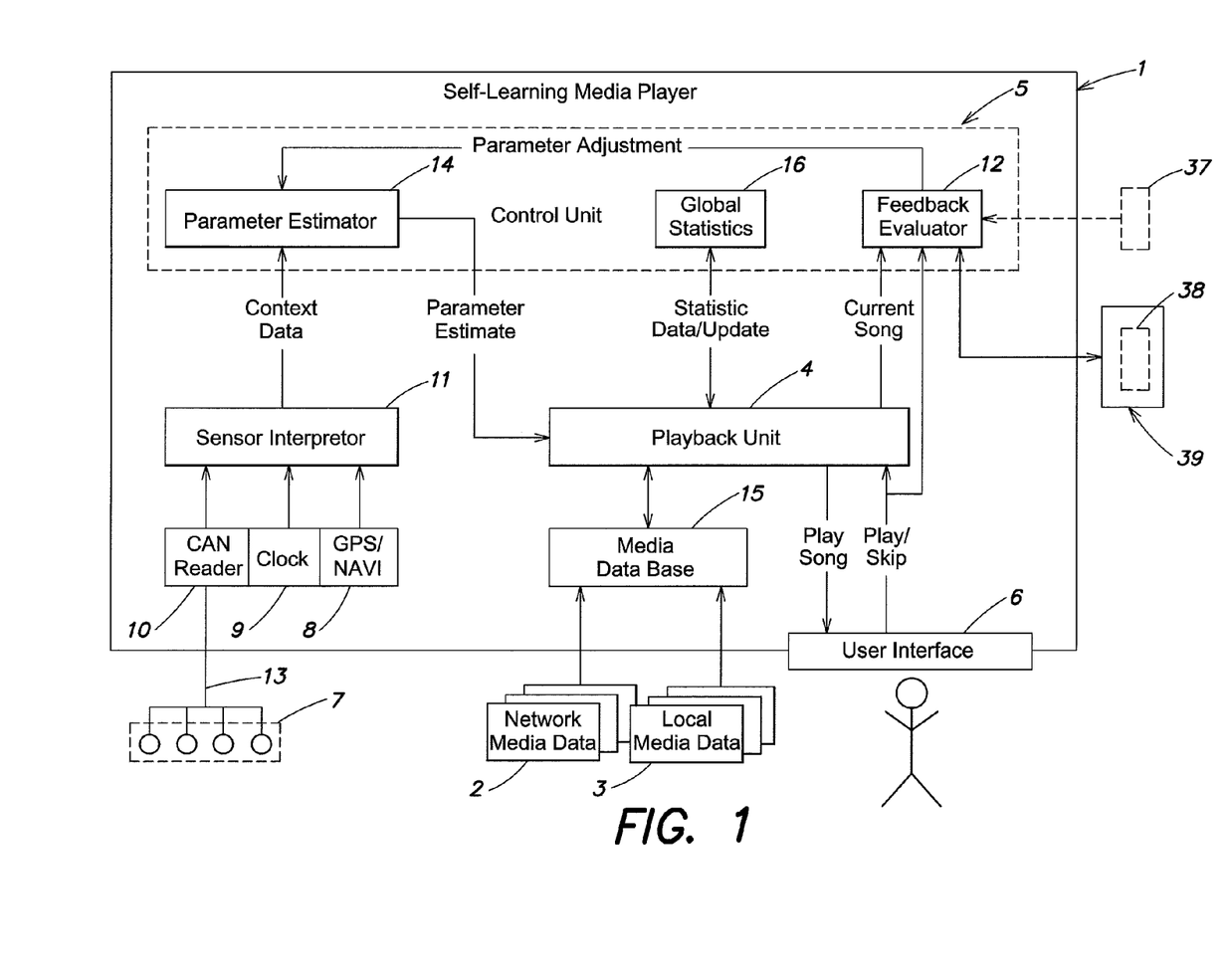
FIG. 1 is a block diagram illustration of a self-learning media player.

FIG. 1 illustrates a media content playback system 1 that has multiple media sources 2, 3 each providing at least one media content or, optionally, that has one media source that provides multiple media contents. The media sources may be, for example, network sources 2 such as computer networks, radio networks, television networks, et cetera or local sources 3 such as for example Compact Discs (CD), Digital Versatile Discs (DVD), volatile and non-volatile semiconductor memories, hard discs and other local memories. The media format employed by the media sources 2, 3 may be any one appropriate for the specific media content to be reproduced.

A playback unit 4 is linked (e.g., wireless or wired) to the media sources 2, 3, for example, through a media data base 15, and is adapted to reproduce the media contents provided by the media sources 2, 3 employing their respective media formats. The playback unit 4 may include software components (e.g., software player having appropriate decoders) and may include, access to or control hardware components such as for example CD and DVD drives, hard drives, flash memories, tuners, receivers, interfaces, signal processors, amplifiers, displays, loudspeakers and the like.

A control unit 5 is linked to and controls the playback unit 4. For controlling the playback unit 4, it is also configured to select one of the media contents to be reproduced by the playback unit 4. The media data base 15 may virtually include, i.e., combine the content of various sources (2, 3) with internal content and/or identifiers, e.g., tags. Alternatively, a multiplexor unit (not shown) is provided in the playback unit 4 (optional in the control unit 5 or as standalone unit) to connect one of the media sources 2, 3 for playback. This multiplexor may be a hardware switch or, as in the present example, may be realized as a software multiplexor within the playback unit 4 and may be operated in connection with a bus system such as the Media Oriented Systems Transport (MOST) Bus. The multiplexor may be operated under the control of the control unit 5 and/or the user to select the media content to be played. A user interface 6 is linked to the control unit 5 and is configured to receive user instructions and to provide first representations thereof to the control unit 5 directly and/or via the playback unit 4.

A time base unit 9 (e.g., clock generator or clock recovery circuit), a global positioning system (GPS) sensor 8 (e.g., of a navigation system) and other sensors 7, are linked to the control unit 5 and provide second representations of the absolute time and/or of at least one physical quantity at or in the vicinity of the location where the selected media content is to be reproduced, e.g., in a vehicle. The absolute time may include time of day, day of the week, month, year, etc. Physical quantities may be the numerical values of measurable properties that describe any physical system's state. The changes in the physical quantities of such system describe its transformation or evolution between its momentary states. For example, the values of temperature (inside and/or outside a vehicle cabin), position of the vehicle and or parts thereof, rotations per minute (RPM) of a vehicle motor, vehicle speed, electrical conductivity between two electrodes and brightness of the light in the vicinity of the vehicle or in the vehicle interior are examples of physical quantities describing the state of a particular vehicle. To measure or detect such quantities, not only are adequate sensors used with which the basic quantities may be measured or detected, but also processing of the sensor signals or of combinations of different physical quantities may be employed to form dedicated sensors such as seat occupation sensors, rain sensors, gear position sensors, etc.

The control unit 5 employs at least one user profile that assigns per user (e.g., single listener or viewer, group of listeners or viewers) media content as identified by certain criteria (e.g., genre, beats per minute, length etc.) to the first and second input data and selects the media content to be reproduced by the playback unit 4 on the basis of this user profile. The first input data include the first representations and the second input data include the second representations. The user profile may include per particular user one or more assignments of the media contents to the first and second input data. Assignment may be carried out by use of a table stored in a memory and may be such that a particular media content is linked to a particular constellation of first and second input data, e.g., in order to represent that a particular user (listener or group of listeners) prefers, in a certain situation characterized by certain first and second input data, to play a certain media content, e.g., a certain song or a group of songs or genre.

Accordingly, in the media content playback method performed by the above described system, multiple media contents are provided by the sources 2, 3. A user profile (e.g., for each user) is provided that includes assignments of the media contents to first and second input data. The first input data are provided by first representations of instructions received from the user. The second input data are provided by second representations derived from measurements of at least one of absolute time, absolute position and one or more physical quantities at or in the vicinity of the location where the selected media content is reproduced. One or more pieces of the media content are chosen, e.g., in an eventually ranked playlist, to be reproduced (played) using the user profile.

In the media content playback system 1 of FIG. 1, which may be arranged in a vehicle such as an automobile, the measurements of physical quantities may be carried out by the sensors 7 that are already available in the vehicle. The sensors 7 may be connected via a bus system such as a Controller Area Network (CAN) Bus 13 to a CAN reader 10 that is configured to read the measurement data provided by the particular sensors 7 and to pass these data to a sensor interpreter 11. The time base unit 9 and the position sensor, i.e., GPS sensor 8, are also connected to the sensor interpreter 11 in order to provide absolute time and positioning data. The sensor interpreter 11 provides to a playback parameter estimator 14, continuously or in certain time intervals, context data derived from the current constellation of time and sensor data. Such constellation may include for example the current absolute time (e.g., year, month, day, hour, minute, second, day of the week), absolute position (e.g., longitude and latitude), inside (vehicle cabin) temperature, outside (ambient) temperature, vehicle speed, seat occupation data, weather data (e.g., rain, barometric pressure), outside (ambient) brightness and other data available in and at the vehicle. The sensor interpreter 11 evaluates the current constellation of data and analyzes the current constellation according to different context criteria. Such criteria may be for example:

Season (summer/fall/winter/spring),

Daytime (night/morning/day/evening),

Weather (sunny/rainy/cloudy; high/low-temperatures), and

Driving (fast/slow; high/low-rpm; high/low-gear).

Referring still to FIG. 1, the self-learning, adaptive media content player 1 includes, as an interface between the user and the algorithm, a feedback evaluator 12, for recording e.g., the skip-behaviour of the user, i.e., his/her tendency to jump over a title played (e.g., in the random shuffle playback mode). In addition, the media content player 1 includes a playback parameter estimator 14, containing the algorithm applied in the selection of titles. The playback parameter estimator 14 receives input data from the feedback evaluator 12 and a synchronized sensor interpreter 11, which uses sensors 7 to register the driving context including for example one or more measured values such as time of day, interior and/or exterior temperature, atmospheric humidity (rain sensor), light intensity, driving speed, engine speed, number of passengers, location/position (GPS) and other related vehicle parameters, and transfers this data to the parameter estimator 14. The parameter estimator 14 receives the sensor (context) and user feedback (parameter adjust) information and, if necessary, adapts the current (parameter) estimate provided to the media player 4 that selects, accordingly, a particular media content. A number of additional media or information sources may be added as desired, such as various data bases, for example a global statistics data base 16, which for example may contain and provide meta data, such as title, artist album, track number etc. (e.g., ID3 tag) or a media content data base, which may include global statistics, i.e., general user preferences that do not depend on a particular context.

Figure 2:
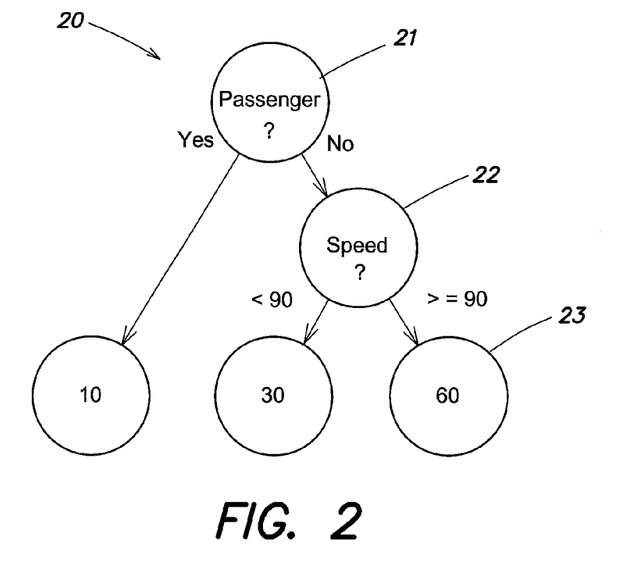
FIG. 2 is a schematic diagram of a regression tree for a specific genre.

The learning and/or selection algorithm may for example employ regression trees or, alternatively, data mining regression trees, artificial neural networks, Bayesian networks, self-organizing maps, adaptive resonance theory networks, cluster analysis, genetic programming, association rule learning or support vector machines or the like. As learning takes place based on empirical data, no preliminary assumptions are required, eliminating the need of a parameterization. Referring to FIG. 2, criteria characterizing a specific media content identifier, e.g., the music genre, is represented by a regression tree 20, in which the inner nodes 22 of the regression tree 20 are employed for the comparison of driving context parameters and the leaves 23 indicate the share of the content played within a certain time window (percentage of a specific music genre, title or genre frequency, etc.), thereby representing the path of the learning process. In the course of every learning process an entire regression tree is newly traversed for each driving context.

Figure 3:
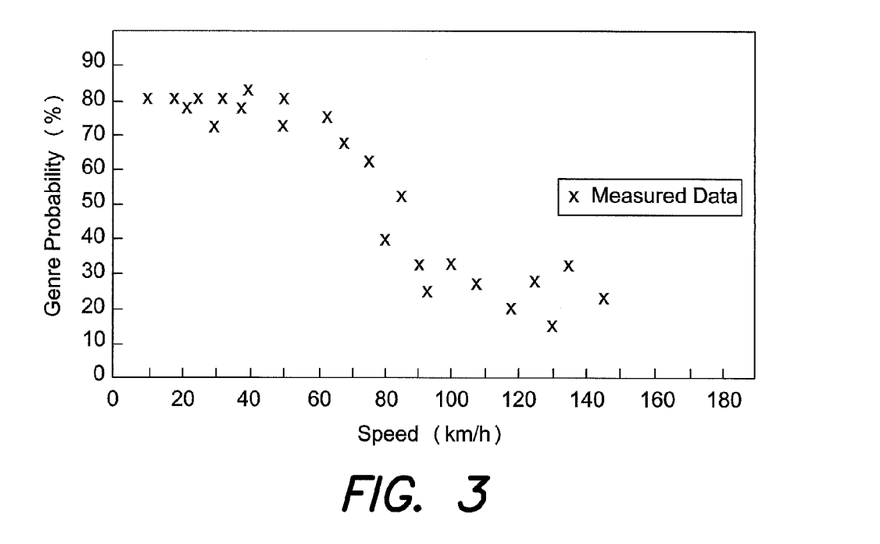
FIG. 3 is a plot of a learning process in which the frequency with which different genres occur throughout the driving context are linked to the driving context.

FIG. 3 exhibits an example set of data learned with respect to a randomly chosen music genre. Each event with regard to sensor and user feedback information may be logged to font a basis for a data set as illustrated in FIG. 3. Such data may represent the frequency of occurrence for a specific content category, e.g., genre, artist, beats per minute, etc., over specific sensor data, e.g., speed, time of the day etc. In the data set(s), homogenous category groups are identified from which rules for regression trees are derived as set forth below with reference to FIG. 4.

Figure 4A:
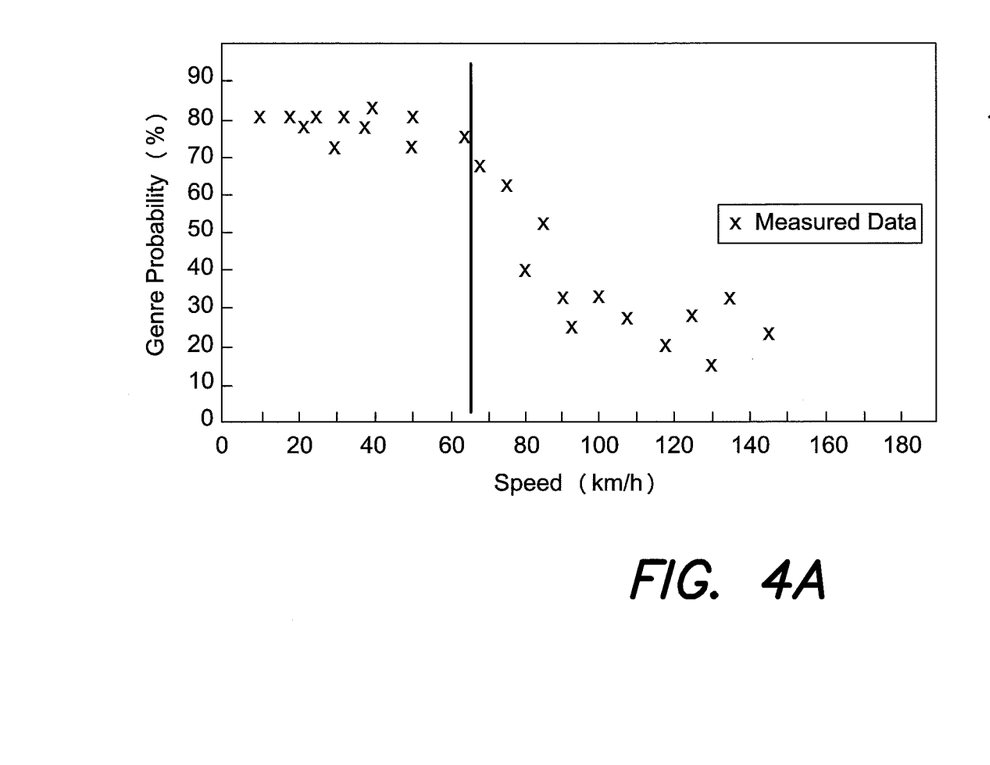
FIGS. 4A-4C are schematic diagrams illustrating the calculation of a regression tree within the context of driving speed, based on the learning process illustrated in FIG. 3.
Figure 4B:
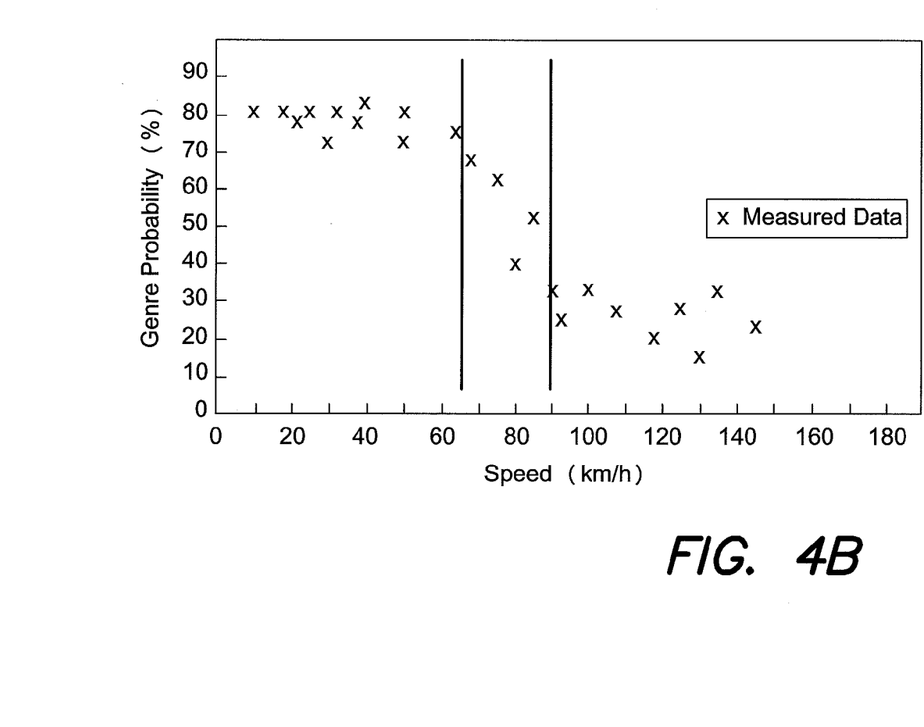
Figure 4C:
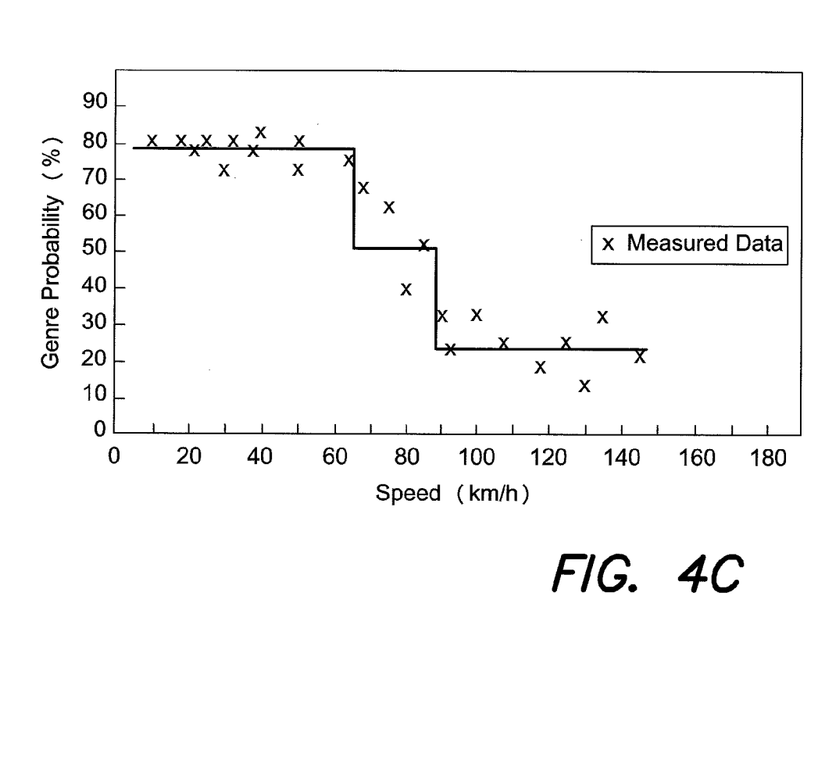

FIGS. 4A-4C illustrate, as an example, how the regression tree may be generated and/or adapted on the basis of numerous learning processes. Referring to FIG. 4A, from the recorded (learned) set of data as shown in FIG. 3 and with a driving speed of $v<64$ km/h an average constant genre frequency of 77% corresponding to a genre probability of 77% for a specific genre is derived at a node 30. Accordingly, a leaf 33 with a 77% genre probability is added to the regression tree. Referring to FIG. 4B, at driving speeds of $v \geq 64$ km/h, a decrease of the genre frequency, with which the given genre is played, is recorded. At driving speeds of $v>90$ km/h the constant average genre frequency is 25%. An additional leaf 34 with a 25% genre probability is added. Referring to FIG. 4C, the remaining driving speed range of $64$ km/h$\leq v \leq 90$ km/h requires a node 35. The music genre frequency for this range is determined from the mean value of the two previously established constant genre frequencies and, thus, is simplified to a constantly set value for driving speeds between 64 km/h≤v≤90 km/h, in the present example, 50%. A respective leaf 36 is added.

In this manner, the calculated regression tree provides a discrete output function that represents the frequency of played music genres as established in reference to the context of the driving speed. One function may refer to the recursive partition of the learned data sets into homogenous subsets. This produces small, easy to handle regression trees.

Referring again to FIG. 1, user profile and the respective input data may be stored in an internal memory, i.e., a memory included in the media playback system 1, such as an internal memory 37 arranged in the feedback evaluator 12 (or in the media data base 15). The user profile (or individual data on which this user profile is based) used by the present system may be taken from this internal memory 37 and, additionally or alternatively, from an external memory 38 such as a memory of an external (mobile) device 39 also employing user profiles, e.g., cellular phones, MP3 players, laptops, personal computers or the like. Accordingly, the user profile generated by the present system may be stored not only in the internal memory 37 but also exported, in total or in parts, to the external memory 38 where it may be processed (e.g., altered, adapted or enhanced), and vice versa.

Exchanging user profiles (or parts thereof such as the pure statistical context data) between the present media playback system and other media players of the same user, and supplementing/updating the user profile(s) on the present media player and the other media player(s) allows for faster and more accurate learning of the user's preferences.

As the user profiles are personalized data sets, it is almost impossible that a user alters the data of his/her profile at the same time in different devices. Therefore, simply a time stamp may be used to identify the latest data that are to be used to update the profile. For example, a user is on his/her way home by car and listens to music that he/she has selected. At 5 p.m. he/she arrives at home and the latest data set or the updated profile is automatically and wirelessly transmitted to his smartphone. The latest profile on the smartphone exhibits the time stamp 8 a.m., of the same day. Accordingly, the smartphone is updated with the data or profile having the time stamp 5 p.m.

Problems may occur when the data transmission between devices is subject to errors or disturbances. When, for example, in the situation outlined above, the data transmission between the car audio system and the smartphone is disturbed or disconnected in one or both directions, at least one of those two devices is not updated by the respective other device. Assuming disconnections occur in both directions, the smartphone is updated with the data/profile collected after 5 p.m. but not with those collected between 8 a.m. and 5 p.m. When, on the next day, the user listens to music in his/her car again he/she updates the "car profile" that does not include the smartphone data. But the smartphone profile is not complete either, since the data collected in the car on the first day have not been transferred to the smartphone. Thus, two separate profiles are updated separately with the effect that none of them includes all data available.

To overcome this drawback, the data that form the basis of a profile (e.g., context data, user instructions statistics, global statistics, general user preferences etc.) may be collected and updated per se in each device and may be assigned a time stamp individually. The profile for this device is then derived from data collected in this particular device and data received from other devices according to the latest time stamps. Alternatively, complete profiles may be exchanged between different devices in which a version number and a device identification number are assigned to the profiles in order to identify the device that performed the latest update on this profile. A transmission error or disconnection (both referred to as synchronization breakdown) can be detected by evaluating the version numbers of the different profiles and the device identification number. If a synchronization breakdown is detected, the divergent profiles may be harmonized by, e.g., averaging data, in particular statistical data.

Further problems may arise from different contents, such as media contents and meta data, in the media data bases of the individual devices. This can be overcome by comparing the contents and adapting the content of one device to the content of the other one by overwriting or by maintaining identical content and adding new content.

The update of the profile per se or individual data of the profile may be performed by the control unit 5. The media data base update may be performed by either the database itself or the control unit 5.

Furthermore, the data used to form a profile may be "time-stamp weighted", i.e., making older data less relevant for the current profile than newer data. This is done to reflect changes of the user's preferences over time.

Figure 5:
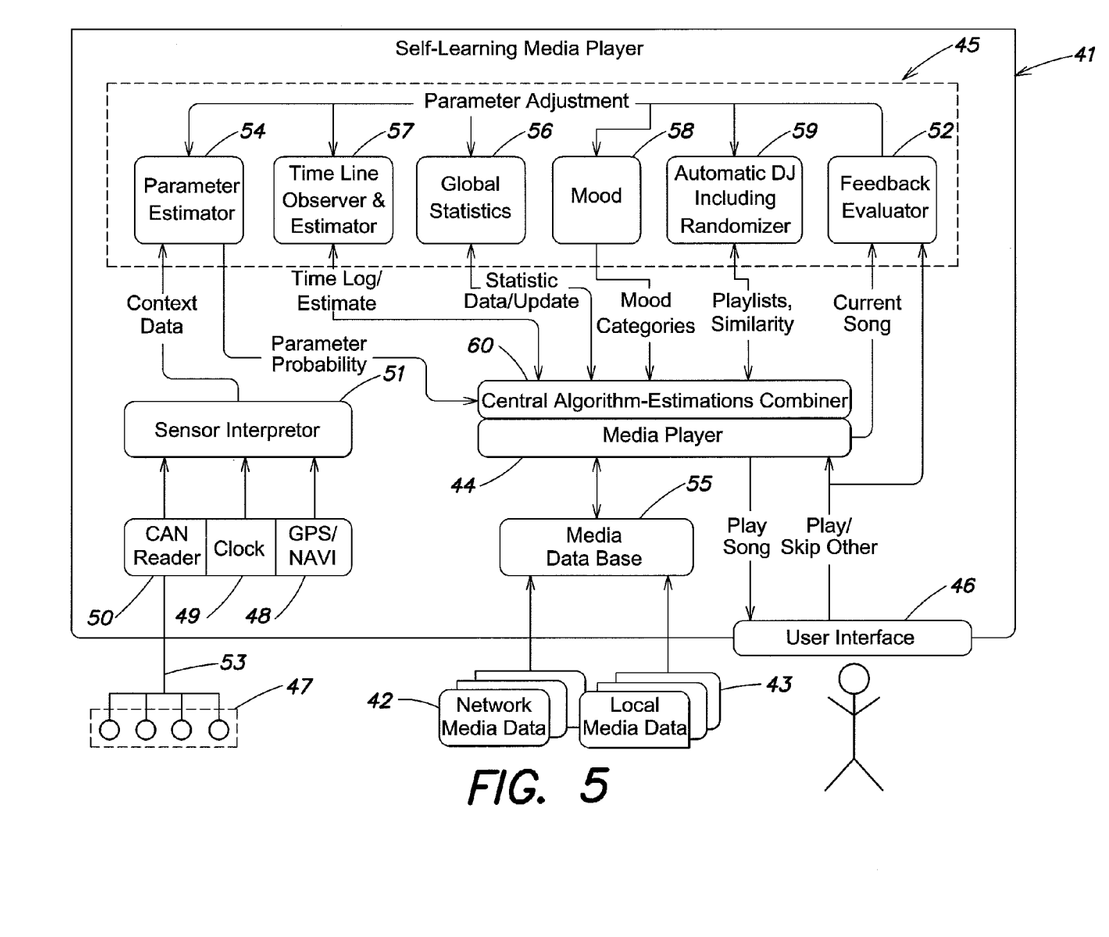
FIG. 5 is a block diagram illustration of another self-learning media player.

FIG. 5 illustrates another media content playback system 41 that includes multiple media sources 42, 43 each providing at least one media content or, optionally, that has one media source that provides multiple media contents. The media sources may be network sources 42 or local sources 43. The media format employed by the media sources 42, 43 may be any one appropriate for the specific media content to be reproduced.

A media player 44 is linked wirelessly or by wire to the media sources 42, 43 through a media data base 55, and is adapted to reproduce the media contents provided by the media sources 42, 43 employing their respective media formats. The media player 44 may include software components (e.g., software player having appropriate decoders) and may include, access to or control hardware components such as for example CD and DVD drives, hard drives, flash memories, tuners, receivers, interfaces, signal processors, amplifiers, displays, loudspeakers and the like.

A control unit 45 is linked to and controls the playback unit 44. For controlling the media player 44, it is also configured to select one of the media contents to be reproduced by the media player 44. The media data base 55 may virtually include, i.e., combine the content of various sources (42, 43) with internal content and/or identifiers, e.g. tags. A user interface 46 is linked to the control unit 45 and is configured to receive user instructions and to provide first representations thereof to the control unit 45 directly and/or via media player 44.

A time base unit 49 (e.g., clock generator or clock recovery circuit), a global positioning system (GPS) sensor 48 (e.g., of a navigation system) and (other) sensors 47, are linked to the control unit 45 through a sensor interpreter unit 51 and provide second representations of the absolute time and/or of at least one physical quantity at or in the vicinity of the location where the selected media content is to be reproduced, e.g., in a vehicle.

The system of FIG. 5 may also include a time line observer and estimator unit 57, a mood unit 58 and an automatic disc jockey (DJ) and randomizer unit 59 which form together with a parameter estimator unit 54, a global statistics unit 56, and a feedback evaluator unit 52 the control unit 45. In the control unit 45, the time line observer and estimator unit 57, the mood unit 58, the automatic DJ and randomizer unit 59 the parameter estimator unit 54, and the global statistics unit 56 are supplied with a parameter adjustment signal from the feedback evaluator unit 52. Furthermore, a central algorithm and estimations combiner unit 60 links the control unit 45, the time line observer and estimator unit 57, the mood unit 58, the automatic DJ and randomizer unit 59 the parameter estimator unit 54, and the global statistics unit 56 to the media player 44. Thereby, parameter probability signals are transmitted from the parameter estimator unit to the central algorithm and estimations combiner unit 60 and mood categories signals are transmitted from the mood unit 58 to the central algorithm and estimations combiner unit 60. Moreover, between the time line observer and estimator unit 57, the global statistics unit 56, and the automatic DJ and randomizer unit 59 time log and estimate signals, statistic data and update signals and playlist and similarity signals, respectively, are exchanged with the central algorithm and estimations combiner unit 60.

The time line observer and estimator unit 57 observes how the preferences of the user change over time and tries to extract certain patterns (e.g., by pattern recognition) which form a basis for user behavior prediction. The global statistics unit evaluates the user's skip behavior, e.g., as a percentage of playtime of a certain song. From such data a top ten list may be created that provides to a central content selection algorithm in the central algorithm and estimations combiner unit 60 weighted data that characterize, inter alia, the user's preferences. The mood unit 58 evaluates the user's mood by investigating, for instance, the user's driving behavior, the user's facial expressions (with a camera), and/or the noise level created by the user etc. Alternatively, a mood level may be input by the user himself/herself. The mood unit may, for these purposes, receive data from the sensor interpreter unit 51 (not shown in the drawings) or may be include its own sensor(s).

Accordingly, the control unit 45 employs at least one user profile that assigns per user (e.g., single listener or viewer, group of listeners or viewers) media content as identified by certain criteria (e.g., genre, beats per minute, length etc.) to the first and second input data and selects the media content to be reproduced by the media player 44 on the basis of this user profile.

The automatic DJ and randomizer unit 59 evaluates the similarity of certain media contents to make sure that the media contents played do not vary too much (e.g., no hard rock music following classical music). The randomizer adds an element of surprise (a random choice within a certain media content similarity) that maintains the adaptivity of the system and method such that they do not end up in a fixed assumed pattern. The central algorithm and estimations combiner unit 60 employs an algorithm that categorizes the media contents to form weighted lists, in particular playlists, from which, e.g., by regression trees songs are selected due to the context (time, situation, ambient conditions etc.) in which the content is to be reproduced.

Accordingly, in the media content playback method performed by the above described system, multiple media contents are provided by the sources 42, 43. A user profile (e.g., for each user) is provided that includes assignments of the media contents to dedicated input data. Sensors 47 may be connected via a bus system such as a CAN-Bus 53 to a reader 50 that is configured to read the measurement data provided by the particular sensors 57 and to pass these data on to a sensor interpreter 51. The time base unit 49 and the position sensor 48 are also connected to the sensor interpreter 51 in order to provide absolute time and positioning data. The sensor interpreter 51 provides to a playback parameter estimator 54, continuously or in certain time intervals, context data 53 derived from the current constellation of time and/or sensor data.

The media contents may include traffic messages that are received (from time to time) from at least one radio station. The traffic messages are likewise selected for reproduction according to the user profile and dependant on the respective context data. Furthermore, at least one of the received traffic messages may be stored in a memory, e.g., the internal memory and be reproduced when traffic messages are selected for reproduction but no traffic message is received at that time from any radio station. The context data used for selecting the traffic message may include the vehicle position, e.g., in order to select the radio station closest to the vehicle position which, due to its proximity, may have the most relevant traffic messages respective to vehicle position.

Although the present invention has been illustrated and described with respect to several preferred embodiments thereof, various changes, omissions and additions to the form and detail thereof, may be made therein, without departing from the spirit and scope of the invention.

What is claimed is:

1. A media content playback method, comprising:
providing a plurality of media contents;
providing for each of the media contents, content information identifying the respective media content;
receiving selection instructions that effect selecting or deselecting of a specific media content;
providing context data based on measurements of one or more of absolute time, absolute position and at least one physical quantity at or in the vicinity of the location where the selected media content is to be reproduced;
providing or adapting a user profile that assigns for each specific media content user instructions to the context data provided at the time of receipt of the respective instruction;
selecting according to the user profile one of the media contents dependent on the context data at the time of selection; and
reproducing the selected media content,
where a location where the selected media content is to be reproduced is a vehicle and in which the context data include measurements of at least one physical quantity in reference to the vehicle, in which the at least one physical quantity related to the vehicle is one of vehicle speed, vehicle position or engine speed, and
where the media contents include traffic messages that are received from at least one radio station and in which the traffic messages are selected for reproduction according to the user profile and dependent on the respective context data.

2. The method of claim 1, in which the absolute time includes at least one of actual time of day, day of the week, calendar date with at least day and month.

3. The method of claim 2, further comprising providing at least one additional user profile that is assigned to another user or a group of users.

4. The method of claim 1, where assignments of media content to context data include respective frequencies of occurrence of selection instructions and in which the selection of media content is depending on the particular frequencies of occurrence.

5. The method of claim 4, in which the assignments are made using regression trees, artificial neural networks, Bayesian networks, self-organizing maps, adaptive resonance theory networks, cluster analysis, genetic programming, association rule learning or support vector machines.

6. The method of claim 1, where the measurements of the at least one physical quantity related to the vehicle are provided by the vehicle.

7. The method of claim 1, where at least one traffic message is stored in a memory and in which the stored traffic message is reproduced when traffic messages are selected for reproduction but no traffic message is received from the at least one radio station.

8. The method of claim 7, where the context data used for selecting the traffic message include the vehicle position.

9. The method of claim 1, where the selection of the media contents is performed in a shuffle mode and in which user instructions that effect selecting or deselecting of a specific media content include a skip instruction as a deselecting instruction and/or a repeat instruction as a selecting instruction.

10. A media content playback method, comprising:
providing a plurality of media contents;
providing for each of the media contents, content information identifying the respective media content;
receiving selection instructions that effect selecting or deselecting of a specific media content;
providing context data based on measurements of one or more of absolute time, absolute position and at least one physical quantity at or in the vicinity of the location where the selected media content is to be reproduced;
providing or adapting a user profile that assigns for each specific media content user instructions to the context data provided at the time of receipt of the respective instruction;
selecting according to the user profile one of the media contents dependent on the context data at the time of selection; and
reproducing the selected media content,
where the external memory is included in a user controllable external media content playback device that provides media content to the user and that provides or adapts a user profile assigning for each specific media content user instructions to context data provided at the time of receipt of the respective instruction in the external media content playback device, and
where the profiles in the internal memory and the external memory or parts thereof comprise a time stamp and in which the profile transfer between the internal memory and the external memory is controlled using the time stamps.

11. A media content playback system, comprising:
a media source that provides a plurality of multiple media contents and that provides for each of the media contents, content information identifying the respective media content;
a playback unit that is linked to the media source and that reproduces the media contents;
a control unit that is linked to and controls the playback unit and that selects one of the media contents to be reproduced by the playback unit;
a user interface that is linked to the control unit and that is adapted to receive instructions and to provide representations thereof to the control unit; and
a time base unit linked to the control unit and that provides representations of the absolute time and/or of at least one physical quantity at or in the vicinity of the location where the selected media content is reproduced; where the control unit is further configured to provide or adapt a user profile that assigns for each media content user instructions to context data provided at the time of receipt of the respective instruction and to select according to the user profile one of the media contents dependent on the context data at the time of selection of the media content,
where a location where the selected media content is to be reproduced is a vehicle and in which the context data include a measurements of at least one physical quantity in reference to the vehicle, in which the at least one physical quantity related to the vehicle is one of vehicle speed, vehicle position or engine speed, and
where the media contents include traffic messages that are received from at least one radio station and in which the traffic messages are selected for reproduction according to the user profile and dependent on the respective context data.

* * * * *